(No Model.) 3 Sheets—Sheet 1.
C. BRADA.
COUNTERSINKING MACHINE.
No. 485,485. Patented Nov. 1, 1892.
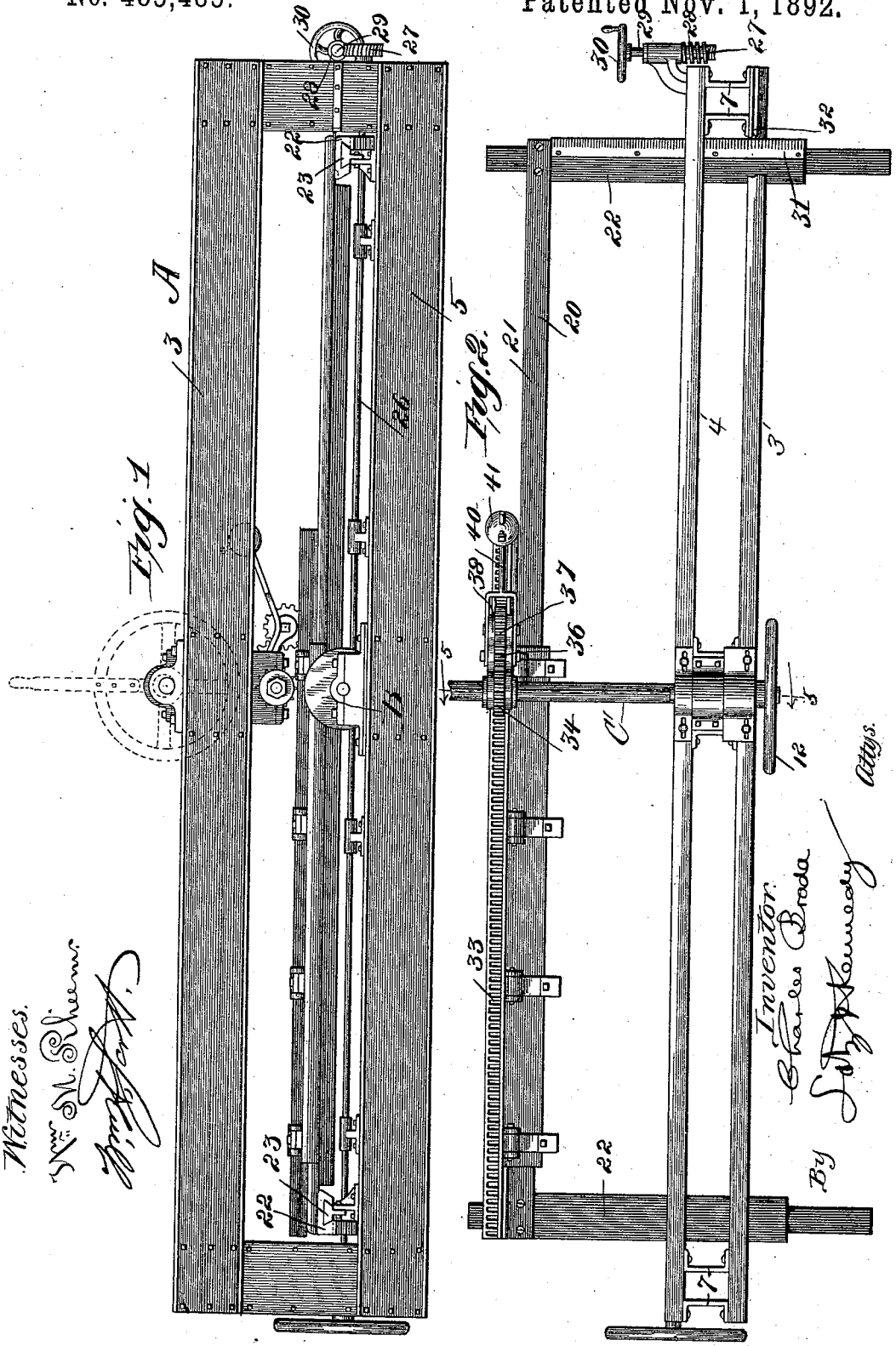

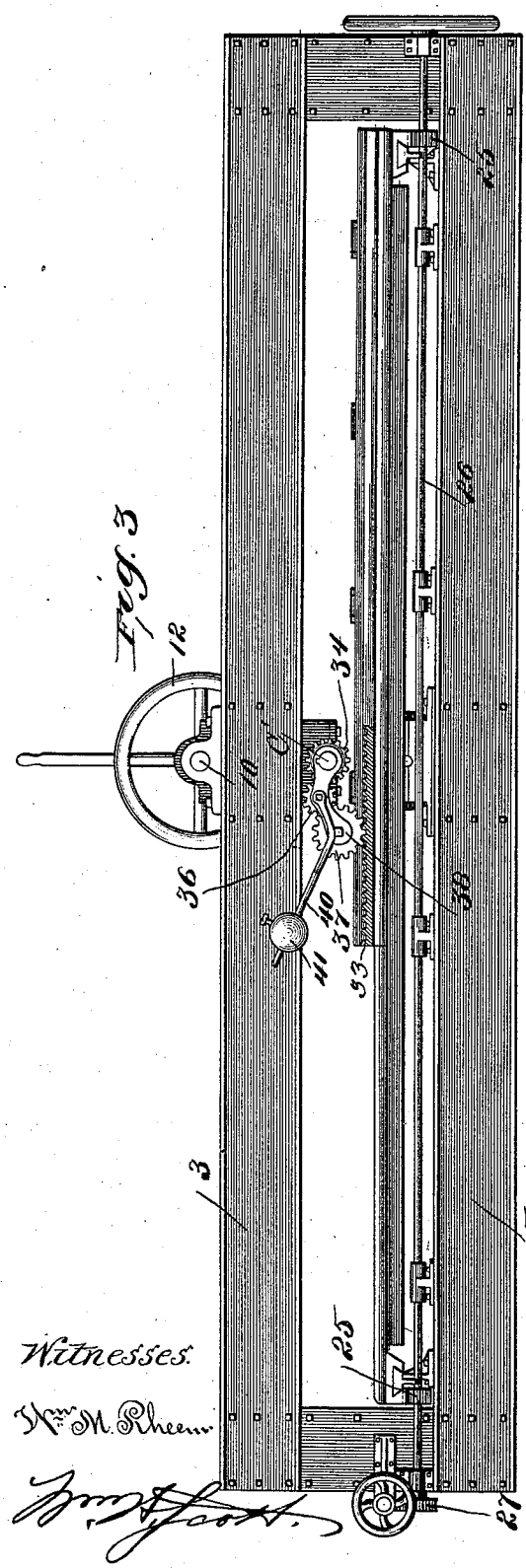

(No Model.) 3 Sheets—Sheet 3.
C. BRADA.
COUNTERSINKING MACHINE.
No. 485,485. Patented Nov. 1, 1892.
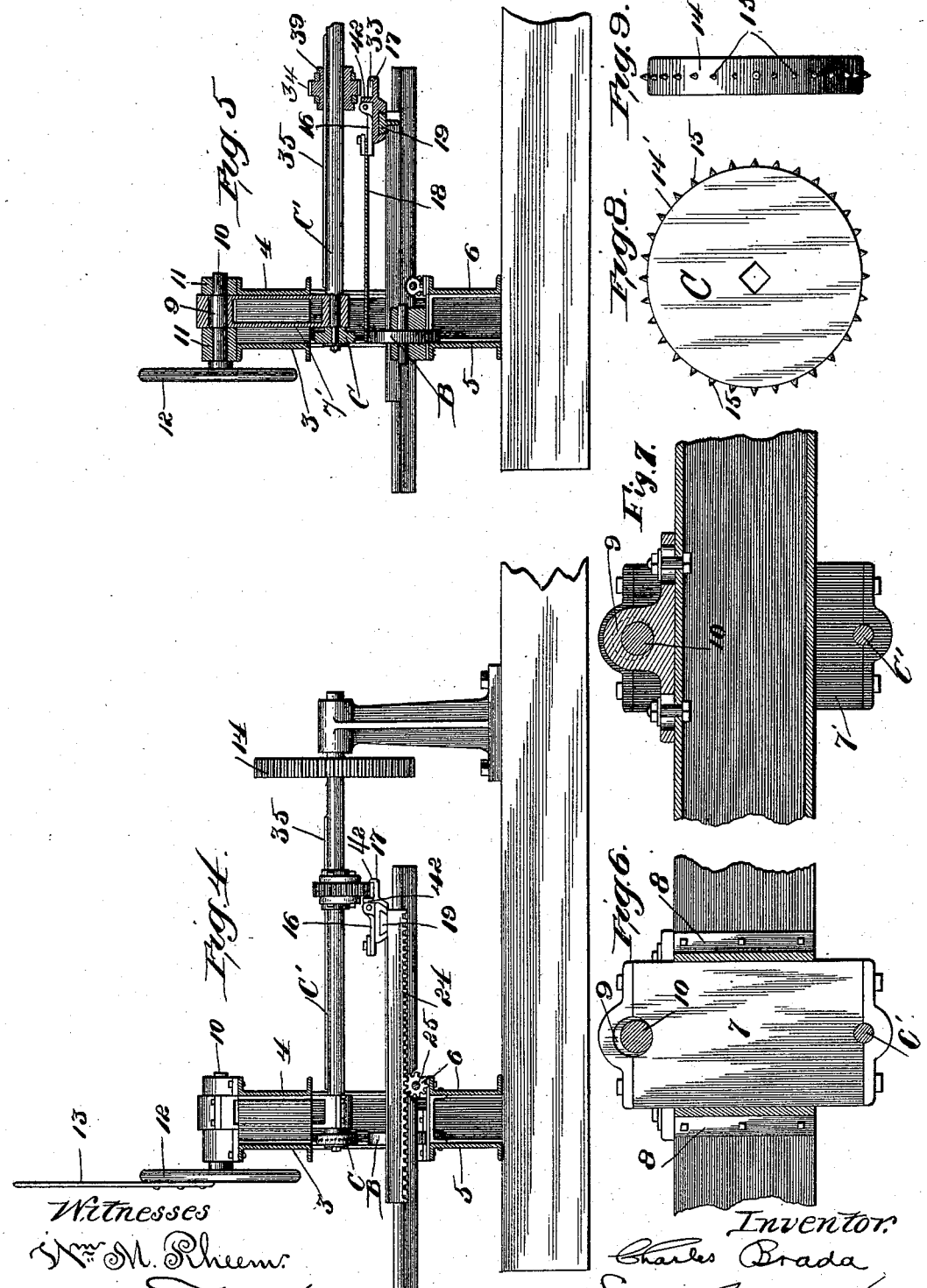
Witnesses
Wm. M. Rheem.
[signature]
Inventor
Charles Brada
By [signature] Kennedy.
Atty's.

UNITED STATES PATENT OFFICE.

CHARLES BRADA, OF CHICAGO, ILLINOIS, ASSIGNOR TO GOETZ & BRADA, OF SAME PLACE.

COUNTERSINKING-MACHINE.

SPECIFICATION forming part of Letters Patent No. 485,485, dated November 1, 1892.

Application filed August 3, 1891. Serial No. 401,587. (No model.)

*To all whom it may concern:*

Be it known that I, CHARLES BRADA, a citizen of the United States, residing at Chicago, in the county of Cook and State of Illinois, have invented certain new and useful Improvements in Countersinking-Machines; and I do hereby declare the following to be a full, clear, and exact description of the invention, such as will enable others skilled in the art to which it appertains to make and use the same.

This invention relates to a machine for countersinking plates and the like, the object being to provide a device of this character of durable and efficient construction.

The invention consists in the features of construction and combination of parts herein fully described and specifically claimed.

In the accompanying drawings, illustrating my invention, Figure 1 is a front elevation of a countersinking-machine constructed in accordance with my invention. Fig. 2 is a top plan view of the same. Fig. 3 is a rear elevation. Fig. 4 is an end elevation, partly in vertical section. Fig. 5 is a vertical transverse section on the line 5 5 of Fig. 2. Figs. 6 and 7 are detail views illustrating the mechanism for adjusting the countersinking-roller. Figs. 8 and 9 are detail views in end and side elevations of the countersinking-roller. Figs. 10, 11, and 12 show sections of plates that have been countersunk by a machine constructed in accordance with this invention.

This machine is primarily intended for use in countersinking the plates that are used for the false bottoms of mash-tubs and the like, and in Figs. 10, 11, and 12 I have shown sections of plates that have been countersunk and afterward finished for use.

It will be understood that the finished plates, as herein shown, could be used for various purposes; but, as before stated, they are primarily intended to be used for the false bottoms of mash-tubs within which the ground malt, mixed with water or other liquids, is placed for obtaining certain extracts that are drained off through the perforations in the plate, while the mash is allowed to remain in the tub. The bottoms of these tubs are perforated with small holes, through which the extract can drain, while the lower ends of these small holes are enlarged or flared to prevent the same from being clogged or stopped up. In Fig. 12 a section of one of these mash-tub bottoms is shown, although in an inverted position; but it will be noticed that small perforations 1 extend through part of the bottom only and are then flared outwardly, as shown at 2.

Heretofore, as far as I am informed, it has been the practice to first countersink the plates to form the flared portion 2 and then to punch the small perforations in by hand. The countersunk openings have been formed by the use of the ordinary punching-machines, to the bed of which the plate to be countersunk has been attached, and the bed has been suitably manipulated to bring the plate into position to receive the punch of the machine in making each countersunk opening.

It is plainly obvious that this is a tedious, lengthy, and expensive operation, for in making each one of the countersunk openings the plate, which is, for instance, ten by five feet in size, must be moved the distance between each opening and brought in its exact position under the punch. The openings being comparatively close together, many thousands will be made in each plate, so that it will be seen that by reason of the time consumed for each adjustment of the plate the operation is a lengthy one, and, further, it is found that, owing to the tediousness and monotony of the work, the workmen cannot continue such work steadily, but it is necessary to change the workmen, as the work is too wearing and fatiguing.

In accordance with my invention the plate to be operated upon is fed between a guide-roller and a countersinking-roller, which latter is provided with punches or points, and said guide and countersinking rollers are located so that the points of the latter do not meet or touch the plain periphery of the former. When the sheet or plate is carried through the machine by means of a feed-table, upon which it is secured, a portion of the plate passes between the countersinking and guide rollers, resting firmly upon the latter as a bed. The points or punches of the countersinking-roller are of such length that they enter the plate and pass only partially therethrough, owing to the location of said countersinking-roller, whose said points or punches, as before described, do not come into contact with the periphery of the guide-roller. The plate, however, rests upon a solid bed, and the result will be that the points or punches of the countersinking-rollers will make a line of indentations or countersunk depressions in the sheet, as shown in Fig. 11.

Referring to said drawings, A indicates as a whole the main frame of the machine, which consists of the two top beams 3 and 4 and the bottom beams 5 and 6. These beams are arranged parallel with each other and are secured together at their ends by the angle-irons 7.

The guide-roller B has a plain periphery and is mounted in bearings upon the bottom beams 5 and 6. The countersinking-roller C is rigidly secured to the end of the shaft C' and is located just above the guide-roller B. Said shaft C' is hung in bearings supported on the top beams 3 and 4, said bearings being vertically adjustable for the purpose of moving the countersinking-roller toward and away from the guide-roller. The devices for adjusting said countersinking-roller comprise a sliding block 7', in the lower end of which shaft C' is journaled. Said block 7' is located between guides 8 on the said top beams and is connected at its upper end with an eccentric 9, rigidly secured to the shaft 10. Said shaft 10 is journaled in bearings 11 on the top beams and is provided at the front of the machine with a hand-wheel 12 and handle 13, by means of which it may be turned. In Fig. 1 the said hand-wheel and handle are shown in dotted lines for convenience of illustration. It will be understood that by turning the shaft 10 and the eccentric 9 the block will be elevated and depressed, and thus raise and lower the end of the shaft C' and the countersinking-roller on the end thereof. The shaft C' extends beyond the rear side of the machine and is provided with the gear-wheel 14, by means of which it can be rotated in either direction by suitable gearing. To permit the play of the fore end of the shaft C', its rear end is mounted loosely in its box or bearing to permit such vertical play.

In Figs. 8 and 9 the countersinking-roller is shown in detail and on an enlarged scale, and it will be seen that from the periphery 14' of said roller the points or punches 15 project. In operation when a sheet is being fed through the machine to be countersunk the roller C is located so that the punches 15 do not meet the guide-roller, and therefore will pass to a certain extent through said plate, but not entirely therethrough, so that the plate is provided with a line of recesses or holes that extend partly through the same. The plate can be fed through with rapidity, and the holes will all be punched with regularity and precision.

In Figs. 4 and 5, 16 indicates a clamp secured to the bed 17. The plate 18 to be operated upon is secured to the bed by said clamp 16, as shown in Fig. 5. The bed 17 is provided on its lower face with a guideway that receives the longitudinal guide 19, carried by the movable frame 20, that is movable transversely to the length of the machine. The said frame 20 is provided with a longitudinal beam 21 and the two end cross-beams 22. The end cross-beams 22 are provided in their lower faces with guideways that receive the guides 23, mounted upon the bottom beams 5 and 6 of the main frame. The cross-beams 22 of said frame 20 are provided with toothed racks 24, that intermesh with the gear-pinions 25, rigidly secured on the longitudinal shaft 26, that extends the entire length of the machine and is provided at one end with a worm-wheel 27, that intermeshes with a worm 28 on a shaft 29, mounted upon the main frame. The shaft 29 is provided with a crank-wheel 30, by means of which it can be turned, and it is obvious that by turning the worm-wheel the movable frame and bed can be moved back and forth transversely to the length of the machine, as desired. This movement of the part of the frame is designed to bring the sheet into position to receive the successive lines of countersunk openings that are made therein, for it will be understood that after the sheet is run through the machine and receives the line of recesses the sheet must be moved slightly to one side to receive the next line, and this is accomplished by elevating the countersinking-roller by the block or eccentric, as above described, then moving the plate into the desired position, and bringing the countersinking-roller again in operating position by the mechanism described.

Upon the cross-piece 22, adjacent the end of the machine at which the worm-wheels are located, is mounted a scale 31, and by means of a pointer 32 upon the main frame the extent to which the frame 20 is moved can be regulated and determined with great precision. At the other end of the machine the said shaft 26 is provided with a large hand-wheel, which can also be used for turning the shaft 26. The mechanism for moving the bed 17 back and forth parallel with the length of the machine comprises a toothed rack 33 upon said bed, that intermeshes with a train-gearing mounted upon the shaft C' and movable longitudinally thereon. Said gearing comprises a gear-wheel 34, having a groove that engages a feather 35 on said shaft. The gear-pinion 36 intermeshes with the gear-wheel 34, and the gear-wheel 37 intermeshes with said gear-pinion and with the toothed rack 33. The gear-pinion 36 and gear-wheel 37 are both supported in the frame 38, that is hung upon the hub 39 of the gear-wheel 34, and forms in effect an expansion-gearing, so that the bed will be geared to the shaft C' at all times. An arm 40, provided with a weight 41, is secured to the frame 38 and serves to keep the gear-wheel 37 in gear with the toothed rack. On either side of the rack 33 are uprising flanges 42, which engage the opposite sides of the gear-wheel 37, so that as the bed 17 is moved transversely to the length of the machine, the train of gearing held by the frame 38 will be moved upon the shaft C'.

In operation the plate 18 is first secured to the bed by the clamps 16 and adjusted to the position where it is desired before commencing the lines of countersunk openings, with the countersinking-roller elevated by means of the block connected with the gear-wheel shaft C' and the shaft 10. The bed is moved so that one end of the plate 18 is between the countersinking-roller and the guide-roller B. The countersinking-roller is then brought down, so that its punches enter the plate to the desired extent. The shaft C' is then turned in the direction to feed the plate forward and also turn the countersinking-roller at the same time. This will make the line of countersunk perforations in the sheet, and the roller is then elevated and the movable frame 20 moved to bring the plate in position to receive another set of holes. The countersinking-roller C is then brought down upon the plate again and the plate fed through.

The rapidity with which the countersunk recesses can be made in the plate is plainly obvious, and the advantage gained over the old way, heretofore referred to, is very marked. It will of course be understood that various changes can be made in the construction of certain parts of these machines and the details of construction changed without departing from the spirit of my invention, and, except in the claims for the specific construction, I do not wish to be limited to the precise construction herein shown.

Although in this specification I have described the guide-roller as the support for the plate when being acted upon, it will be understood that any suitable support can be used, although the one described is found to be preferably the most convenient.

I claim as my invention—

The combination, substantially as hereinbefore set forth, of a main frame, a guide-roller, a revoluble countersinking-roller secured upon a shaft mounted in a movable bearing on the main frame, a bed movable parallel with and at right angles to the length of the machine, and expansion-gearing between said shaft and bed, movable longitudinally upon said shaft.

In testimony whereof I affix my signature in presence of two witnesses.

CHARLES BRADA.

Witnesses:
HARRY COBB KENNEDY,
OTTO LUEBKERT.